United States Patent
Pol et al.

(10) Patent No.: US 6,271,826 B1
(45) Date of Patent: Aug. 7, 2001

(54) MIXING A GRAPHICS SIGNAL AND A VIDEO SIGNAL

(75) Inventors: Evert J. Pol; Marinus Van Splunter, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/977,951

(22) Filed: Nov. 25, 1997

(30) Foreign Application Priority Data

Dec. 6, 1996 (EP) .................................................. 96203399
Mar. 13, 1997 (EP) .................................................. 97200753

(51) Int. Cl.$^7$ ..................................................... G09G 5/02
(52) U.S. Cl. ........................................... 345/150; 345/199
(58) Field of Search ................................... 345/150–153, 345/199; 348/589–600

(56) References Cited

U.S. PATENT DOCUMENTS

| | | | |
|---|---|---|---|
| 5,243,447 | * 9/1993 | Bodenkamp et al. ................ | 345/133 |
| 5,384,519 | * 1/1995 | Gotoh .................................... | 315/324 |
| 5,519,450 | * 5/1996 | Urbanus et al. ...................... | 348/589 |
| 5,543,820 | * 8/1996 | Edgar .................................... | 345/153 |
| 5,818,613 | * 10/1998 | Masterson et al. .................. | 358/520 |
| 5,846,136 | * 4/1999 | Augustine et al. ................... | 345/150 |
| 5,896,122 | * 4/1999 | MacDonald et al. ................ | 345/153 |
| 5,896,136 | * 4/1999 | Augustine et al. ................... | 345/150 |
| 5,956,015 | * 9/1999 | Hino ...................................... | 345/153 |

FOREIGN PATENT DOCUMENTS

WO97/33437 * 9/1997 (WO) ............................ H04N/9/74

* cited by examiner

Primary Examiner—Amare Mengistu
(74) Attorney, Agent, or Firm—Edward W. Goodman

(57) ABSTRACT

In a method of mixing a graphics signal and a video signal in a ratio alpha:(1-alpha), where the graphics signal is obtained by addressing a color look-up table (CLUT) in which color values (R, G, B) are stored, the number of color values stored for each mixing ratio depends on the mixing ratio so as to obtain an optimum filling of the color look-up table.

7 Claims, 1 Drawing Sheet

MIXING A GRAPHICS SIGNAL AND A VIDEO SIGNAL

BACKGROUND OF THE INVENTION

The invention relates to a method and a device for mixing a graphics signal and a video signal, and to a multimedia apparatus comprising such a device.

SUMMARY OF THE INVENTION

It is, inter alia, an object of the invention to provide a graphics/video signal mixing in which an optimum efficiency of hardware elements is achieved. To this end, a first aspect of the invention provides a method of storing color values and a mixing factor into a color look-up table, characterized in that the number of color values stored for each mixing factor depends on the mixing factor. A second aspect of the invention defines a method of mixing a graphics signal and a video signal in a ratio alpha:(1-alpha), where the graphics signal is obtained by addressing a color look-up table in which color values are stored, characterized in that the number of color values stored for each mixing ratio depends on the mixing ratio. A third aspect of the invention defines a device for mixing a graphics signal and a video signal in a ratio alpha:(1-alpha), where the graphics signal is obtained by addressing a color look-up table in which color values are stored, characterized in that the number of color values stored for each mixing ratio depends on the mixing ratio. A fourth aspect of the invention defines a multimedia apparatus comprising a graphics and video signal mixing device as described above, and a display coupled to an output of said mixing device. Advantageous embodiments are defined in the dependent claims.

A primary aspect of the invention provides a method of mixing a graphics signal and a video signal in a ratio alpha:(1-alpha), where the graphics signal is obtained by addressing a color look-up table in which color values are stored, in which the number of color values stored for each mixing ratio depends on the mixing ratio to obtain an optimum filling of the color look-up table. The term "color values" not only covers red, green and blue color values, but also values which represent colors by means of a luminance value and chrominance values.

These and other aspects of the invention will be apparent from and elucidated with reference to the embodiments described hereinafter.

BRIEF DESCRIPTION OF THE DRAWING

In the drawing, the FIGURE shows a display apparatus in accordance with the present invention.

DESCRIPTION OF THE PREFERRED EMBODIMENT

Figure 1:
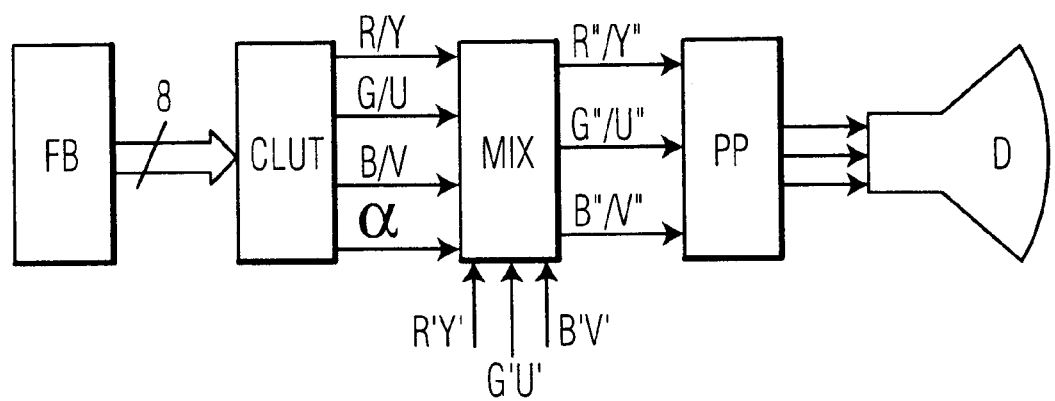

In the FIGURE, a frame buffer FB furnishes an 8-bit address signal to a color lookup table CLUT. The color look-up table CLUT furnishes color values R (red), G (green) and B (blue), or luminance signals Y and chrominance signals U, V, as well as a mixing factor alpha ($\alpha$), to a first input of a mixer MIX. A second input of the mixer MIX receives a video signal in the form of color signals R', G' and B', or in the form of a luminance signal Y' and chrominance signals U', V'. The mixer MIX furnishes an output signal in the form of color signals R", G" and B", or in the form of a luminance signal Y" and chrominance signals U", V". The mixer output signal is applied to a display D thru a post-processing unit PP. If the mixer output signal is built up by means of the luminance signal Y" and chrominance signals U", V", the post-processing unit PP ensures a necessary conversion to RGB color signals. The display apparatus of the FIGURE may be a television receiver equipped with a teletext function; other applications are, however, by no means excluded, so that the invention is broadly applicable in any multimedia apparatus in which graphics information and a video signal are mixed before they are displayed. A terminal (e.g., a set-top box on a TV set) comprising the color look-up table CLUT with pre-defined contents (a standard table), is able to receive and display bit-maps encoded in accordance with the standard table, without the need to transmit the standard table with the bit-maps, and without having to carry out complicated color translations within the terminal.

This invention concerns a display system, which incorporates a frame buffer FB, a color look-up table CLUT, and a video mixer MIX. An image is stored in the frame buffer FB and can be displayed by the system mixed with video, in several levels of transparency. The main idea of the invention is how to fill the available space in the CLUT effectively, and how to combine this usage of the CLUT with image-processing techniques, such as dithering and color space conversion.

Each pixel datum as produced by the frame buffer FB during the display process is used in the CLUT as an address in the table which stores three color values and one transparency value. Useful choices for color components are the red, green and blue triplet, or the YUV triplet. The transparency value is usually indicated by alpha. The mixer takes the graphics color values as produced by the clut, multiplies them by alpha, takes the video color values, multiplies these by (1-alpha) and adds the two products, resulting in a weighted average between graphics and video inputs, with the weight determined by alpha. Hence, each pixel may have a different weight. (Full transparency: alpha=0, no transparency: alpha=1.)

In consumer systems, both the number of bits per pixel as stored in the frame buffer and the number of entries in the CLUT are usually very small. Typically, the frame buffer FB stores 8 bits per pixel, and the number of CLUT entries is appropriately 256. This means that great care must be taken in the usage of the available entries in the CLUT. There are several good ways of filling in the CLUT, but only for CLUT's that produce just color values. The CLUT as discussed here also produces alpha values, and therefore, a new way of filling the CLUT is needed.

The simplest approach is to assign a regular lattice in the color-transparency space to the CLUT. This means that we choose a number of levels for the three color components and the alpha channel, and fill the CLUT with the Cartesian product (i.e., all combinations) of these levels. For example, we could assign 4 levels to each channel, resulting in 4×4×4×4=256 entries, filling the CLUT precisely. Supposing we work with RGB color components, a somewhat wiser choice might be (R G B alpha) 4×5×3×4=240 levels. Even though the CLUT is not entirely filled, the resulting picture may actually be better, because the green channel is dominant in determining picture quality.

Filling the CLUT with a Cartesian product is helpful when the images to be stored in the frame buffer need to be dithered. Dithering images is a (collection of) technique(s) through which the number of colors in a single image is reduced, while keeping image quality more or less acceptable. More sophisticated dithering algorithms maintain a great deal of the quality, but take much processing power to execute. One way of reducing algorithm complexity is to dither each color component separately, which requires a CLUT filling that is a cartesian product. Reference is made to European Patent Application EP-A-0,639,920, corresponding to U.S. Pat. No. 5,734,368, for a preferred image rendering system employing dithering with a reduced palette of colors.

However, allowing all transparency levels to have the same number of CLUT entries is not a good way of using the CLUT space. This can be seen by looking at the full transparency level (alpha=0), where only one entry would suffice. Generalizing, at lower alpha values, fewer input color levels are needed to achieve the same output color resolution. As alpha is used as a linear factor on each of the graphics color channels, the number of color linear factor on each of the graphics color channels, the number of color levels should approximately rise linearly with the alpha value.

This means that the total number of colors per transparency level should rise approximately with the cube of alpha. Suppose $0<=\backslash<=A$, i.e., there are A+1 transparency levels. Assuming that the number of colors for \1 is C, the total number of colors is approximately $A^2*(A+1)^2*C/4$ when summing over all alpha levels. Assuming again that the total number of colors in the CLUT is 256, the following table results:

| A =      | 1     | 2     | 3     | 4     | 5     | 6     | 7     |
|----------|-------|-------|-------|-------|-------|-------|-------|
| C =      | 256.0 | 28.4  | 7.11  | 2.56  | 1.138 | .5805 | .3265 |
| $C*A^3$ = | 256   | 227.5 | 192.0 | 163.8 | 142.2 | 125.4 | 112.0 |

The next step is to find a suitable position for the colors per transparency level. Suppose we are interested in the application of simple dithering methods in this system. Then it would be advantageous to have, at each transparency level, a cartesian product in the CLUT. This means that, at each transparency level, the number of colors we reserve in the CLUT should be a product of three numbers, being the number of color levels for each of the color channels.

As an example, let it be assumed that there are RGB color channels. It is well known that the blue channel needs the least amount of resolution, the red channel needs some more, and the green channel requires a still higher resolution. As the transparency level influences all three color channels, it needs the highest resolution as compared to the color channel resolutions at the highest alpha level. A reasonable allocation of levels would be (R,G,B,\)=(5,6,4,7). Note that this corresponds closest to the figures for A=6 above.

Starting from the options A=6 or A=7, we can try to find nice fillings of the CLUT with Cartesian products at other levels. One aspect that needs to be taken into account is that, at lower resolution levels, the number of levels should be increased to some extent, because the calculations have been rounded down and these rounding errors are particularly noticeable at a low resolution. For example, when \=1, i.e., at the lowest transparency level that still shows some graphics, the minimum number of levels for each color channel is 2, resulting in a minimum CLUT usage of 8. This results in the following division:
A=6 (i.e., 7 levels of transparency)

| α        | 0 | 1   | 2   | 3    | 4    | 5    | 6     |
|----------|---|-----|-----|------|------|------|-------|
| $C*α3$   | 0 | 0.6 | 4.6 | 15.7 | 37.2 | 72.3 | 125.4 |

-continued

| R,G,B   | 1,1,1 | 2,2,2 | 2,3,2 | 3,3,2 | 3,4,3 | 4,5,3 | 5,6,4 |
|---------|-------|-------|-------|-------|-------|-------|-------|
| R*G*B   | 1     | 8     | 12    | 18    | 36    | 60    | 120   |

Total number of colors used: 255.

An implementation of a entries look-up Table with a variable number of CLUT entries per Transparency value follow below.
Number of Transparency values: 5 (100% 75% 50% 25% 0%)

EXAMPLE clut[14]=[0,127,255], in which 14 is the CLUT index, 0 is the value of the red color signal R, 127 is the value of the green color signal G, and 255 is the value of the blue color signal B.

CLUT entries for transparency = 0% clut[0] = [0, 0, 0]
clut[1] = [0, 0, 127]
clut[2] = [0, 0, 255]
clut[3] = [0, 31, 0]
clut[4] = [0, 31, 127]
clut[5] = [0, 31, 255]
clut[6] = [0, 63, 0]
clut[7] = [0, 63, 127]
clut[8] = [0, 63, 255]
clut[9] = [0, 95, 0]
clut[10] = [0, 95, 127]
clut[11] = [0, 95, 255]
clut[12] = [0, 127, 0]
clut[13] = [0, 127, 127]
clut[14] = [0, 127, 255]
clut[15] = [0, 159, 0]
clut[16] = [0, 159, 127]
clut[17] = [0, 159, 255]
clut[18] = [0, 191, 0]
clut[19] = [0, 191, 127]
clut[20] = [0, 191, 255]
clut[21] = [0, 223, 0]
clut[22] = [0, 223, 127]
clut[23] = [0, 223, 255]
clut[24] = [0, 255, 0]
clut[25] = [0, 255, 127]
clut[26] = [0, 255, 255]
clut[27] = [63, 0, 0]
clut[28] = [63, 0, 127]
clut[29] = [63, 0, 255]
clut[30] = [63, 31, 0]
clut[31] = [63, 31, 127]
clut[32] = [63, 31, 255]
clut[33] = [63, 63, 0]
clut[34] = [63, 63, 127]
clut[35] = [63, 63, 255]
clut[36] = [63, 95, 0]
clut[37] = [63, 95, 127]
clut[38] = [63, 95, 255]
clut[39] = [63, 127, 0]
clut[40] = [63, 127, 127]
clut[41] = [63, 127, 255]
clut[42] = [63, 159, 0]
clut[43] = [63, 159, 127]
clut[44] = [63, 159, 255]
clut[45] = [63, 191, 0]
clut[46] = [63, 191, 127]
clut[47] = [63, 191, 255]
clut[48] = [63, 223, 0]
clut[49] = [63, 223, 127]
clut[50] = [63, 223, 255]
clut[51] = [63, 255, 0]
clut[52] = [63, 255, 127]
clut[53] = [63, 255, 255]
clut[54] = [127, 0, 0]

-continued

```
clut[55]  = [127, 0, 127]
clut[56]  = [127, 0, 255]
clut[57]  = [127, 31, 0]
clut[58]  = [127, 31, 127]
clut[59]  = [127, 31, 255]
clut[60]  = [127, 63, 0]
clut[61]  = [127, 63, 127]
clut[62]  = [127, 63, 255]
clut[63]  = [127, 95, 0]
clut[64]  = [127, 95, 127]
clut[65]  = [127, 95, 255]
clut[66]  = [127, 127, 0]
clut[67]  = [127, 127, 127]
clut[68]  = [127, 127, 255]
clut[69]  = [127, 159, 0]
clut[70]  = [127, 159, 127]
clut[71]  = [127, 159, 255]
clut[72]  = [127, 191, 0]
clut[73]  = [127, 191, 127]
clut[74]  = [127, 191, 255]
clut[75]  = [127, 223, 0]
clut[76]  = [127, 223, 127]
clut[77]  = [127, 223, 255]
clut[78]  = [127, 255, 0]
clut[79]  = [127, 255, 127]
clut[80]  = [127, 255, 255]
clut[81]  = [191, 0, 0]
clut[82]  = [191, 0, 127]
clut[83]  = [191, 0, 255]
clut[84]  = [191, 31, 0]
clut[85]  = [191, 31, 127]
clut[86]  = [191, 31, 255]
clut[87]  = [191, 63, 0]
clut[88]  = [191, 63, 127]
clut[89]  = [191, 63, 255]
clut[90]  = [191, 95, 0]
clut[91]  = [191, 95, 127]
clut[92]  = [191, 95, 255]
clut[93]  = [191, 127, 0]
clut[94]  = [191, 127, 127]
clut[95]  = [191, 127, 255]
clut[96]  = [191, 159, 0]
clut[97]  = [191, 159, 127]
clut[98]  = [191, 159, 255]
clut[99]  = [191, 191, 0]
clut[100] = [191, 191, 127]
clut[101] = [191, 191, 255]
clut[102] = [191, 223, 0]
clut[103] = [191, 223, 127]
clut[104] = [191, 223, 255]
clut[105] = [191, 255, 0]
clut[106] = [191, 255, 127]
clut[107] = [191, 255, 255]
clut[108] = [255, 0, 0]
clut[109] = [255, 0, 127]
clut[110] = [255, 0, 255]
clut[111] = [255, 31, 0]
clut[112] = [255, 31, 127]
clut[113] = [255, 31, 255]
clut[114] = [255, 63, 0]
clut[115] = [255, 63, 127]
clut[116] = [255, 63, 255]
clut[117] = [255, 95, 0]
clut[118] = [255, 95, 127]
clut[119] = [255, 95, 255]
clut[120] = [255, 127, 0]
clut[121] = [255, 127, 127]
clut[122] = [255, 127, 255]
clut[123] = [255, 159, 0]
clut[124] = [255, 159, 127]
clut[125] = [255, 159, 255]
clut[126] = [255, 191, 0]
clut[127] = [255, 191, 127]
clut[128] = [255, 191, 255]
clut[129] = [255, 223, 0]
clut[130] = [255, 223, 127]
clut[131] = [255, 223, 255]
clut[132] = [255, 255, 0]
clut[133] = [255, 255, 127]
clut[134] = [255, 255, 255]
```

CLUT entries for transparency = 25%

```
clut[135] = [0, 0, 0]
clut[136] = [0, 0, 255]
clut[137] = [0, 42, 0]
clut[138] = [0, 42, 255]
clut[139] = [0, 85, 0]
clut[140] = [0, 85, 255]
clut[141] = [0, 127, 0]
clut[142] = [0, 127, 255]
clut[143] = [0, 170, 0]
clut[144] = [0, 170, 255]
clut[145] = [0, 212, 0]
clut[146] = [0, 212, 255]
clut[147] = [0, 255, 0]
clut[148] = [0, 255, 255]
clut[149] = [85, 0, 0]
clut[150] = [85, 0, 255]
clut[151] = [85, 42, 0]
clut[152] = [85, 42, 255]
clut[153] = [85, 85, 0]
clut[154] = [85, 85, 255]
clut[155] = [85, 127, 0]
clut[156] = [85, 127, 255]
clut[157] = [85, 170, 0]
clut[158] = [85, 170, 255]
clut[159] = [85, 212, 0]
clut[160] = [85, 212, 255]
clut[161] = [85, 255, 0]
clut[162] = [85, 255, 255]
clut[163] = [170, 0, 0]
clut[164] = [170, 0, 255]
clut[165] = [170, 42, 0]
clut[166] = [170, 42, 255]
clut[167] = [170, 85, 0]
clut[168] = [170, 85, 255]
clut[169] = [170, 127, 0]
clut[170] = [170, 127, 255]
clut[171] = [170, 170, 0]
clut[172] = [170, 170, 255]
clut[173] = [170, 212, 0]
clut[174] = [170, 212, 255]
clut[175] = [170, 255, 0]
clut[176] = [170, 255, 255]
clut[177] = [255, 0, 0]
clut[178] = [255, 0, 255]
clut[179] = [255, 42, 0]
clut[180] = [255, 42, 255]
clut[181] = [255, 85, 0]
clut[182] = [255, 85, 255]
clut[183] = [255, 127, 0]
clut[184] = [255, 127, 255]
clut[185] = [255, 170, 0]
clut[186] = [255, 170, 255]
clut[187] = [255, 212, 0]
clut[188] = [255, 212, 255]
clut[189] = [255, 255, 0]
clut[190] = [255, 255, 255]
```

CLUT entries for transparency = 50%

```
clut[191] = [0, 0, 0]
clut[192] = [0, 0, 255]
clut[193] = [0, 51, 0]
clut[194] = [0, 51, 255]
clut[195] = [0, 102, 0]
clut[196] = [0, 102, 255]
clut[197] = [0, 153, 0]
clut[198] = [0, 153, 255]
clut[199] = [0, 204, 0]
clut[200] = [0, 204, 255]
clut[201] = [0, 255, 0]
clut[202] = [0, 255, 255]
clut[203] = [127, 0, 0]
clut[204] = [127, 0, 255]
clut[205] = [127, 51, 0]
clut[206] = [127, 51, 255]
clut[207] = [127, 102, 0]
clut[208] = [127, 102, 255]
```

-continued

```
clut[209] = [127, 153, 0]
clut[210] = [127, 153, 255]
clut[211] = [127, 204, 0]
clut[212] = [127, 204, 255]
clut[213] = [127, 255, 0]
clut[214] = [127, 255, 255]
clut[215] = [255, 0, 0]
clut[216] = [255, 0, 255]
clut[217] = [255, 51, 0]
clut[218] = [255, 51, 255]
clut[219] = [255, 102, 0]
clut[220] = [255, 102, 255]
clut[221] = [255, 153, 0]
clut[222] = [255, 153, 255]
clut[223] = [255, 204, 0]
clut[224] = [255, 204, 255]
clut[225] = [255, 255, 0]
clut[226] = [255, 255, 255]
```
CLUT entries for transparency = 75%

```
clut[227] = [0, 0, 0]
clut[228] = [0, 0, 255]
clut[229] = [0, 85, 0]
clut[230] = [0, 85, 255]
clut[231] = [0, 170, 0]
clut[232] = [0, 170, 255]
clut[233] = [0, 255, 0]
clut[234] = [0, 255, 255]
clut[235] = [255, 0, 0]
clut[236] = [255, 0, 255]
clut[237] = [255, 85, 0]
clut[238] = [255, 85, 255]
clut[239] = [255, 170, 0]
clut[240] = [255, 170, 255]
clut[241] = [255, 255, 0]
clut[242] = [255, 255, 255]
```
CLUT entry for transparency = 100%

```
clut[243] = [0, 0, 0]
```

These values for R, G, B do not care.

A primary aspect of the present invention can be summarized as follows. The invention concerns the use of a color look-up table (CLUT) in a display, where the contents of a frame buffer are superposed onto a video image at one of a plurality of transparency levels. More specifically, an optimum way of filling the CLUT is described. Preferably, the number of possible colors for a given transparency level depends on the mixing ratio alpha: at a 100% transparency, a single value suffices, while the largest number of colors is needed at 0% transparency. Advantageously, a third power relationship is used. The number of colors is the product of the number RR of red values times the number GG of green values times the number BB of blue values, where preferably GG>=RR>=BB.

It should be noted that the above-mentioned embodiments illustrate rather than limit the invention, and that those skilled in the art will be able to design many alternative embodiments without departing from the scope of the appended claims. The invention can be implemented by means of hardware comprising several distinct elements, and by means of a suitably programmed computer.

What is claimed is:

1. A method of storing color values and mixing factors in a color look-up table, characterized in that the method comprises the steps:
   determining a number of color values for each of the mixing factors in dependence on the respective mixing factor; and
   storing each of the numbers of color values and each respective mixing factor in the color look-up table.

2. A method of mixing a graphics signal and a video signal in a mixing ratio, said method including the step: obtaining the graphics signal and a mixing factor by addressing a color look-up table in which color values and mixing factors are stored,
characterized in that said color look-up table contains a different number of color values for each mixing factor, wherein the number of color values stored for each mixing factor depends on the respective mixing factor.

3. A device for mixing a graphics signal and a video signal in a mixing ratio, said device comprising:
   a color look-up table in which color values and mixing factors are stored;
   means for addressing the color look-up table for obtaining the graphics signal and the mixing factor; and
   means for mixing the obtained graphics signal with the video signal in the mixing ratio using the obtained mixing factor, characterized in that the color look-up table contains a different number of color values for each mixing factor, wherein the number of color values for each mixing factor depends on the respective mixing factor.

4. A device for mixing a graphics signal and a video signal in a mixing ratio, said device comprising:
   a color look-up table in which color values and mixing factors are stored;
   means for addressing the color look-up table for obtaining the graphics signal and the mixing factor; and
   means for mixing the obtained graphics signal with the video signal in the mixing ratio using the obtained mixing factor, characterized in that the color look-up table contains a different number of color values for each mixing factor, wherein the number of color values for each mixing factor depends on the respective mixing factor,
wherein the mixing means multiplies the graphic signal by the obtained mixing factor, and wherein the number of color values stored for each mixing factor depends on the third power of the respective mixing factor.

5. A device for mixing a graphics signal and a video signal in a mixing ratio, said device comprising:
   a color look-up table in which color values and mixing factors are stored;
   means for addressing the color look-up table for obtaining the graphics signal and the mixing factor; and
   means for mixing the obtained graphics signal with the video signal in the mixing ratio using the obtained mixing factor, characterized in that the color look-up table contains a different number of color values for each mixing factor, wherein the number of color values for each mixing factor depends on the respective mixing factor,
wherein the color values include green, red and blue color values, and wherein a number of different green color values is equal to or exceeds a number of different red color values, and the number of different red color values is equal to or exceeds a number of different blue color values.

6. A device as claimed in claim 5, wherein a number of different mixing factors is equal to or exceeds the number of different green color values.

7. A multimedia apparatus, comprising:
   the device for mixing a graphics signal and video signal in a mixing ratio as claimed in claim 3; and
   a display coupled to an output of said mixing device.

* * * * *